United States Patent [19]

Lancia et al.

[11] 4,270,362

[45] Jun. 2, 1981

[54] CONTROL SYSTEM FOR AN AIR CONDITIONING SYSTEM HAVING SUPPLEMENTARY, AMBIENT DERIVED COOLING

[75] Inventors: Frederick N. Lancia; Albert O. Kesterson, both of Columbus; Edward K. Feeney; Ralph C. Liebert, both of Worthington, all of Ohio

[73] Assignee: Liebert Corporation, Columbus, Ohio

[21] Appl. No.: 21,638

[22] Filed: Mar. 19, 1979

Related U.S. Application Data

[63] Continuation-in-part of Ser. No. 779,744, Apr. 29, 1977, abandoned.

[51] Int. Cl.³ .................. F25B 29/00; F25B 41/00
[52] U.S. Cl. .................................. 62/173; 62/182; 62/203; 236/1 E
[58] Field of Search ................ 62/180, 181, 182, 185, 62/173, 203, 332; 236/1 EA

[56] References Cited

U.S. PATENT DOCUMENTS

| | | |
|---|---|---|
| 1,863,576 | 6/1932 | Morse et al. |
| 2,279,657 | 4/1942 | Crawford ...................... 62/181 X |
| 3,525,385 | 8/1970 | Liebert ...................... 165/30 |

*Primary Examiner*—William E. Wayner
*Attorney, Agent, or Firm*—Gerald L. Smith; Jerry K. Mueller, Jr.

[57] ABSTRACT

Temperature and humidity electrical/electronic control circuits and apparatus to maintain a room at a constant temperature and humidity. The control system is adapted to an environmental condition controller for year-around cooling utilizing a liquid recirculating to an outside coil for free cooling or free reheat dehumidification. The controls provide a sequencing function to actuate one or more temperature and/or humidity conditioners in response to the degree and percentage of change. The circuit provides a ramp function signal for proportional control over an initial temperature range of free cooling and step controls over other predetermined temperature ranges. The circuit comprises a high fidelity ramp generator linearly responsive to the degree of temperature change up to a predetermined set point. A dehumidification signal is developed and fed to the same ramp generator to carry out air cooling to remove moisture. The system provides a reheat ramp signal operable, in accordance with the need for reheat, along with a staging of auxiliary heating feature.

32 Claims, 4 Drawing Figures

CONTROL SYSTEM FOR AN AIR CONDITIONING SYSTEM HAVING SUPPLEMENTARY, AMBIENT DERIVED COOLING

RELATED APPLICATIONS

The present application is a continuation-in-part of application Ser. No. 779,744 filed Apr. 29, 1977 now abandoned.

BACKGROUND OF THE INVENTION

As industry has turned to an extensive utilization of complex processing and control equipment, a concomitant need has arisen for specialized treatment of the environment within which this equipment operates. Exemplary of such equipment are computer installations which exhibit relatively high heat emission rates representing a generally continuous (year around) load to air conditioning equipment, the operational demands upon which have heretofore been typically seasonal in nature. In addition to requiring accurate removal of generated heat loads, such installations further require control over the relative humidity within their zonal environment.

Heretofore, the air conditioning industry has responded to requirements for providing accurate temperature and humidity control within the enclosed regions of computer rooms and the like, on the one hand, with the somewhat brute force approach of operating typical refrigeration components to continuously treat air within the zone surrounding the equipment. As might be expected, the energy demands associated with such an approach do not represent an insignificant cost factor. In another approach, advantage has been taken of seasonally lower outdoor (ambient) temperatures by a controlled mixing of cooler outdoor air with recirculated air. This commingling of air permits an intermitant deactivation of energy consuming refrigeration components.

Humidity control typically is carried out through the use of humidifiers to add moisture generally at the output region of air conditioning apparatus, while dehumidification, on the other hand, is a more elaborate process. Typically, dehumidification requires the operation of refrigeration components to remove moisture and this operation usually is associated with a reheating of the thus dehumidified but cooled air to regain the required zone target or "set point" temperature. One disadvantage attendant with the use of outside air to contribute to cooling stems from the general tendency of industry to locate computer rooms and the like well within the internal regions of buildings. As a consequence, access to outside air can be achieved only through the use of extensive and bulksome ducting, a requirement rendering the otherwise achieved energy conservation impractical and economically unsound. However, should the location disadvantage be overcome, typically encountered variations in ambient air humidity have been found to counteract the energy gains from utilizing outdoor air at lower temperature, inasmuch as a greater consumption of energy is required to carry out humidification and dehumidification than initially conserved in using the outside air. This outside air also will contain undesirable contaminants such as dust and the like.

The first practical system introduced to industry wherein effective energy conservation was achieved taking advantage of lower outside or ambient air temperatures is described in U.S. Pat. No. 3,525,385. This system provides an outdoor heat exchanger which operates in conjunction with a liquid heat exchanging medium, such as glycol or the like, which is pumped through conduits into the building retaining the enclosed air conditioned region and at which point this fluid is utilized both to provide heat exchange within the condenser units of a refrigeration system and, alternately, to provide cooling through the use of a liquid cooling coil interposed within the air flow of the internally disposed air conditioning equipment. Thus, as outdoor temperatures drop below predetermined levels, full advantage is taken of those lower levels to accommodate the heat loads imposed from computer equipment and the like. Alternately, in warmer seasons, the higher outdoor temperatures can be utilized to provide a reheat function utilizing the heat exchange liquid in conjunction with now operating refrigeration components. As industry has seen fit to adapt this energy conserving system, the term "free-cooling" has been found to be used to describe such an energy saving feature.

Even greater efficiencies or reductions in energy consumption have been recognized in an improved air conditioning system based upon the above, first practical free cooling approach. Described, for example, in application for U.S. Patent Ser. No. 779,743, by Ralph C. Liebert, filed Mar. 21, 1977, and entitled: "Liquid Refrigeration System for an Enclosure Temperature Controlled Outdoor Cooling or Preconditioning". This improved system significantly expands the capability of air conditioning apparatus to utilize the effects of outdoor temperatures which vary above or below the desired predetermined or set point temperature level of the air within the zone to be conditioned. For example, the system utilizes substantially all of the cooling capability of the outdoor air by precooling recirculated or return air within the system to the extent possible before such air is treated by energy consuming refrigeration components operating in conjunction with the evaporator coils and the like. The improved system further takes advantage of heat generating compressors to carry out a reheating function in conjunction with the operation of refrigeration components for dehumidification.

By taking advantage of a broadened range of outdoor temperatures, this improved air conditioning system requires control features which are capable of responding to a correspondingly broad range of temperature conditions both within the zone wherein air is conditioned as well as at the outdoor heat exchanger locale. Thus, an accurate control responsive to react to small changes in heat loadings as well as to ambient temperature variations is desired to gain highest efficiencies for the system. Additionally, such controls should operate under a logic wherein energy conservation is enhanced, i.e. wherein components of highest power consumption are utilized most sparingly.

A variety of control circuits have been introduced in the past for the purpose of controlling earlier air conditioning systems. For example, reference is made to U.S. Pat. Nos., 3,522,451; 3,714,980; 3,883,757 and 3,844,475.

SUMMARY

The present invention is addressed to a new and improved control system for carrying out the control of an air conditioning system of a type operated within a confined region on a year around basis and which takes advantage of the economies available through utilization of the effects of outdoor ambient temperatures.

The air conditioning system operates in conjunction with refrigeration components including operatively associated evaporator coils, condensers and one or more compressors. Of these components, the condensers of the system are associated in heat exchange relationship with a heat exchanger situated within an ambient, outdoor environment remote from the region enclosing the air to be conditioned. This association is provided by a heat exchange fluid, such as glycol, which is pumped from the heat exchanger through input and output conduits. The system includes a cooling coil which is positioned to cool air directed into a conventional refrigeration evaporator coil. This cooling coil is controlled by a cooling valve which is actuable to be selectively positioned in orientations between a fully open position circuiting the heat exchange fluid to the cooling coil and a closed position wherein such fluid is directed toward the condenser units of the refrigeration system. To operate the system so as to obtain a predetermined or set point temperature within the zone, a temperature sensor is positioned so as to sense the temperature of return air and the signal developed thereby is utilized by comparison network means which derives an output signal having a value corresponding with the temperature difference between the set point temperature of and, in one aspect, a higher temperature of the return air. A level responsive switching arrangement is provided which is coupled with the comparison network and serves to energize a first compressor within the refrigeration system when the comparison network signal is at a predetermined level corresponding with a difference between the set point temperature and return air temperature of a first predetermined magnitude. In the presence of this condition, the first compressor and attendant refrigeration components are activated. The system further incorporates a valve control network also connected with the comparison network which operates in conjunction with a voltage level responsive actuator for controlling the cooling valve by circuiting heat exchange fluid to the cooling coil in proportion with the temperature differences measured by the comparison circuit when those differences are less than a second predetermined magnitude which is less than the first predetermined magnitude. Thus, as cooling is called for within the pertinent zone, the system will react first to utilize that cooling capacity of the fluid exchange medium and, only when that is insufficient, the energy consuming compressor units and related refrigeration components are activated. This condition obtains additionally where two compressors or more are utilized, the second compressor stage being activated only when the combined cooling effects of the cooling coil and the evaporator coil driven in conjunction with the first compressor are insufficient to accommodate the heat load of the enclosed region. Correspondingly, the system carries out the deactivation of the highest energy consuming components on a higher priority basis than the cooling generated from the heat exchange fluid. In consequence, the cost of maintaining requisite set point temperatures for such installations is minimized.

Another object and aspect of the invention is to combine the above components additionally with a dehumidification capability wherein an excessive humidity level is accommodated for by initially activating the cooling coil and its related valve and additionally the second of the compressor stages. While such dehumidification procedure will lower the moisture content of the air, the temperature of that air also may be lowered below the desired set point temperature. Accordingly, the system reacts to reheat the thus cooled and dehumidified air. Reheating takes place in similar fashion as the cooling process of the system. In this regard, a valve is progressively opened to divert warmed heat exchange fluid to a heating coil. Should the extent of heating be insufficient, the system then responds to utilize hot refrigerant gases which are directed to a second heating coil within the system. The system thus achieves efficient operation, giving precedence to the utilization of the heat exchange medium for heating purposes. To achieve a desirable staged use of hot refrigerant gas or auxiliary heating units within the system, threshold responsive triggering circuits are utilized which exhibit a hysteresis characteristic permitting them to continue to operate at temperature differentials less than those initially activating them. This arrangement permits the system to respond more effectively to the zone temperature alterations caused by the operation of individual components within the system.

Other objects of the invention will, in part, be obvious and will, in part, appear hereinafter.

The invention, accordingly, comprises the apparatus and system possessing the construction, combination of elements and arrangement of parts which are exemplified in the following detailed disclosure. For a fuller understanding of the nature and objects of the invention, reference should be had to the following detailed description taken in connection with the accompanying drawings.

DETAILED DESCRIPTION OF THE DRAWINGS

Figure 1:
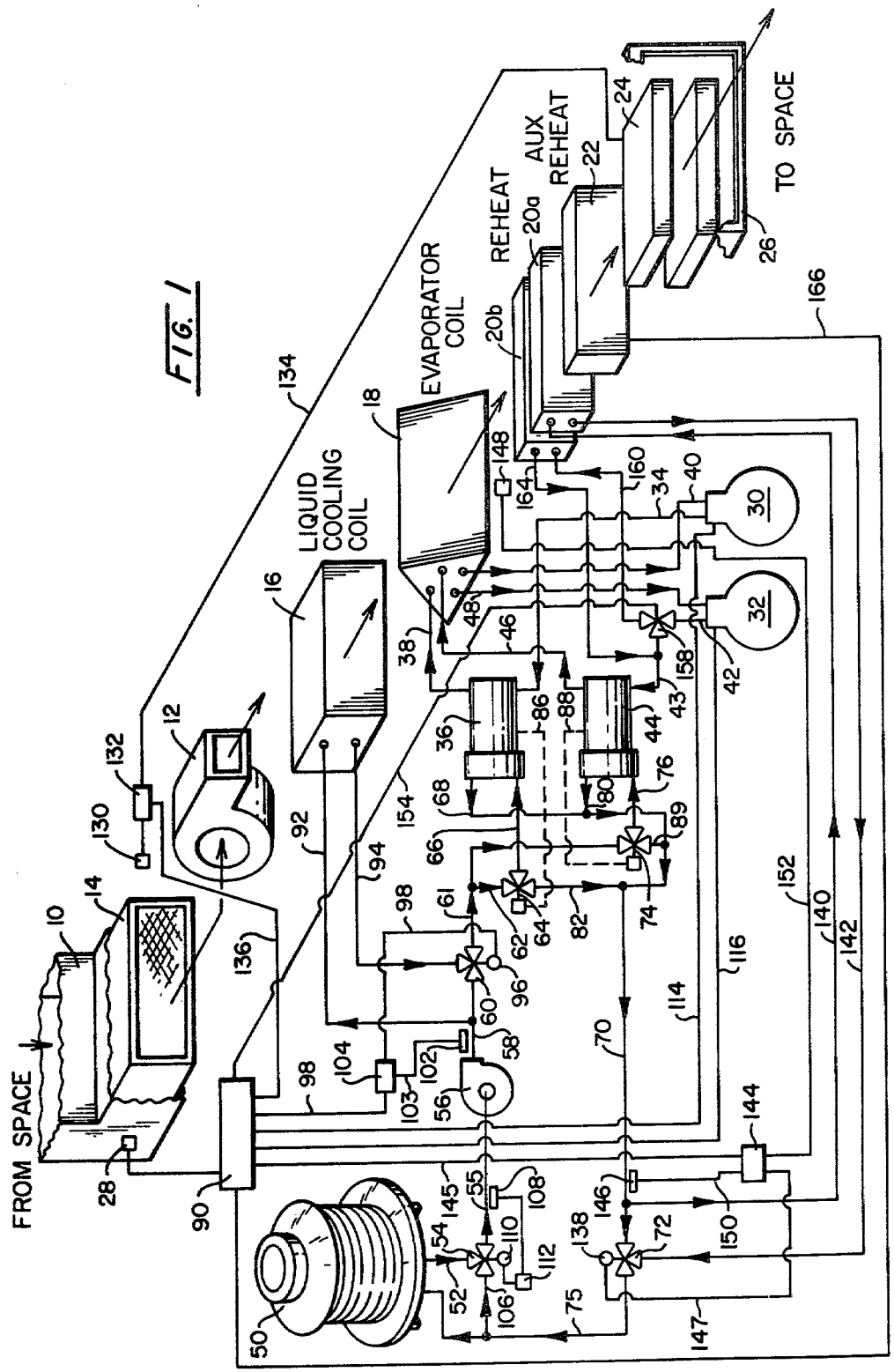
FIG. 1 is the over all schematic of the control circuit of the present invention together with the air condition system of the co-pending application, supra.

Referring to FIG. 1, a schematic representation of the control system of the invention as it performs in conjunction with the improved air conditioning system described in the above-identified application for U.S. Patent is portrayed. As the description of this figure unfolds, it will become apparent that four distinct flow patterns are represented in the drawing, an air flow pattern from the space or zone containing a heat load to the input of the air conditioning system as return air, the circulating loops of heat exchange fluid, the circuiting of refrigerant, and the associated electronic components of a control circuit. In its general treatment, air is returned from load space, for example via a duct or input 10 in consequence of the operation of supply fan 12. The resultant air flow passes through a filter 14 and thence encounters and passes through a liquid cooling coil 16, at which position it will be seen to be cooled to an extent made available in consequence of the temperatures of the embient environment remote from the enclosed zone or region within which the system serves to treat air.

From liquid cooling coil 16, the air passes through an evaporator coil 18 at which position it may be cooled by the refrigeration components of the system. Positioned downstream in the sense of air flow from evaporator coil 18 are reheat coils 20a and 20b which serve to selectively add thermal energy to the air having passed through evaporator coil 18. This reheat function generally is utilized in connection with the operation of evaporator coil 18 and liquid cooling coil 16 for dehumidification purposes. An auxiliary reheat coil 22 is positioned downstream from coils 20a and 20b, and may be present as an electrical resistance unit or may contribute additional heat energy from any of a variety of sources available from the vicinity within which the system is operated. The system also includes a humidification stage which is represented generally at 24 and positioned, for illustrative purposes, adjacent an output duct 26. With the arrangement shown, air having been treated by the system leaves duct 26 to encounter the heat load within the zone being temperature and humidity controlled. Upon undergoing heat exchange with this load, the resultant return air is drawn through return air or input duct 10 by the fan function 12 in continuous loop fashion. As the return air is drawn into duct 10, its temperature is sensed at a temperture sensor 28 which may be present as a thermistor or the like and which derives a signal representing a feedback from the treated zone which is utilized by the control system of the invention.

The refrigeration components of the system are somewhat conventional in nature, compressor stages being operated in conjunction with condensers to develop cooling at the evaporator coil 18. Two such compressor stages are represented in the drawing at 30 and 32, the hot refrigerant gas output of compressor stage 30 being shown schematically as directed along line 34 to be cooled at condenser 36. From condenser 36, the now liquefied refrigerant is directed, as represented schematically by line 38, to evaporator coil 18, at which point expansion is carried out to develop refrigeration cooling. The output or suction line of the refrigeration circuit is represented at line 40 being redirected to compressor stage 30. In similar fashion, compressor stage 32, when activated, provides a hot refrigerant gas output at line 42 which is directed through three-way valve 158 and line 43 into a condenser 44 to exit therefrom generally in liquefied form along line 46 for introduction into an additional stage of evaporator coil 18. As before, the suction line output for the latter components is provided along line 48 for reassertion at compressor stage 32.

Condensers 36 and 44 operate in conjunction with a heat exchange fluid such as a conventional anti-freeze or glycol which extends through input and output conduits to a heat exchanger 50 which is located remotely from the zone or region of air being treated. The terms "input" and "output" are used herein in the sense that the input is to heat exchanger 50 and the output is therefrom. Heat exchanger 50 is positioned to be affected by the seasonally fluctuating temperature conditions of ambient, outdoor air. Consequently, this unit typically is referred to as an "outdoor heat exchanger". When operating in heat exchange relationship with condensers 36 and 44, cooled heat exchange fluid (glycol or the like) is drawn through heat exchanger output or discharge conduit 52 and liquid temperature control or mixing valve 54 as well as line 55 by a circulation pump 56, the fluid thence being driven along output conduit 58, through cooling valve 60, thence along conduits 61 and 62 through a diverting valve 64 and conduit 66 into condenser 36. Upon carrying out its heat exchange function within condenser 36, the heat exchange fluid exits therefrom along conduit 68 whereupon it is passed along input conduit 70 to confront and selectively pass a heating valve 72, whereupon it is directed through input conduit 75 to outdoor heat exchanger 50. In similar fashion, heat exchange fluid passes from conduit 61 into one input of a diverting valve 74, thence through conduit 76 to be passed in heat exchange relationship within condenser 44 and exit therefrom, following heat exchange, along output conduit 80. Conduit 80 is coupled with conduit 68 leading, through conduit 70, as described above, to the outdoor heat exchanger 50.

The amount of heat exchange fluid which is passed by the system through condensers 36 and 44 is only that which is required to maintain proper refrigeration condensing temperatures. Accordingly, not all of the available fluid is utilized during typical operations. Accordingly, diverting valve 64 is connected through conduit 82 to input conduit 70. This valve is a head pressure actuated type, as represented schematically by the pressure input line 86. In similar fashion, valve 74 is head pressure actuated, as represented at dashed line 88, so as to divert flow from conduit 76 through input conduits 89, 82 and 70 in correspondence with condensing needs. This particular arrangement, wherein, for a significant number of operational days the entire heat exchange capability of the system comprising the heat exchange fluid and heat exchanger 50 is not demanded by condensers 36 and 44, permits a performance wherein that fluid may be used for the second purpose of gaining cooling effects from ambient surroundings.

Now, turning to that conservation feature of the system, temperature sensor 28 has been described as looking to the heat load effect upon the system by measuring the temperature of return air. This sensed temperature is compared within the system with a "set point" or predetermined temperature level desired for the zone air being treated. Typically, such a set point will be selected as 75° F. The control system of the invention, through an arrangement represented by function block 90 and described in detail later herein, compares the sensed temperature with this set point temperature and serves in response thereto to selectively circuit cooled heat exchange fluid from conduit 58 through liquid cooling coil supply conduit 92 to liquid cooling coil 16, the fluid being returned along conduit 94 to cooling valve 60 following heat exchange with return air within the system. The extent of this circuiting of heat exchange fluid through conduit 92 is proportioned in correspondence with the extent of the differential between the set point temperature and temperature sensed at sensor 28. Accordingly cooling valve 60 is actuated by a voltage level responsive motor 96 which is energized to selective orientations between fully open (circuiting fluid to coil 16) and closed positions (isolating coil 16) in correspondence with a signal asserted from function block 90 through line 98. Such valves as at 60 and associated motors 96 are available in the market place, one such motor being marketed under the trade designation "Honeywell Modutrol Motor" Model M734D by Honeywell Inc., Minneapolis, Minn., 55422.

As a condition precedent to a signal being asserted through line 98 progressively opening the valve 60 to conduit 94, the temperature of heat exchange fluid within conduit 58 at least must be lower than the return air temperature. However, it has been found to be convenient to provide that the temperature of the fluid in conduit 58 be lower by a predetermined amount (e.g. 1° F.) than the "set point" temperature. To carry this condition out, an enabling switch arrangement is provided within the control system including a sensor 102, measuring the temperature of liquid within conduit 58, which is functionally coupled by line 103 to a snap action-like switch 104, the combination being referred to generally as an "aquastat". Such aquastats are available to industry, for example, being marketed under the trade designation "Honeywell Aquastat" Model T6031A-1052, by Honeywell Corp., (supra).

Inasmuch as the fluid within conduit 58 will attain temperatures within a broad range thereof, including those which may be considered quite cool, liquid temperature control valve 54 is connected having an available mixing input of higher temperature heat exchange fluid from conduits 75 and 106 which it may draw upon and mix with cooler fluid entering the valve from conduit 52. By limiting the lowest temperature which the fluid may exhibit within conduit 55 through this mixing activity, frost or moisture development upon the output conduit extending into the building containing the zone or region of air treatment is avoided. Note that the valve includes a thermostat sensor 108, valve control motor 110 and control thermostat 112. The valve may be provided as a Model V-5013A, motor 110 as a Model M-934A and thermostat 112 as Model T991A all by Honeywell Corp. (supra).

The system as thus far described may exhibit a maximum air conditioning capability with the full utilization of the heat exchange fluid as cooled at outdoor heat exchanger 50 and circulating through conduits 92 and 94 to coil 16 and, additionally with the activation of both compressor stages, 30 and 32 of the refrigeration system. Control over the activation and deactivation of these latter stages is provided from control system 90, as indicated schematically by respective lines 114 and 116, extending therebetween. Looking additionally to FIG. 3, this cooling operation of the system may be explored in more detail. In the figure, the set point temperature of the system is shown by a vertical line positioned at the center of a chart, the abscissa extending to the right of which describes conditions wherein the zone temperature, as witnessed at sensor 28, increases from the set point temperature. In effect, the abscissa shows temperature difference values between the set point temperature and that temperature witnessed at sensor 28, a range generally of about 3° F. A ramp shaped line 120 is provided in the figure to very generally depict the type of voltage signal generated to develop cooling logic control over the components of the system. When zone temperatures are at least within a fraction of a degree of the set point temperature as represented at a, cooling valve 60 is in a closed orientation wherein no fluid flow is permitted through conduits 92 and 94 to liquid cooling coil 16. However, as the air within the treated zone increases in temperature, function 90 develops a correspondingly progressively increasing linear voltage value which is utilized in controlling motor 96 of valve 60. Thus, cooling valve 60 assumes progressively more open positions permitting the correspondingly greater flow of heat exchange fluid through conduits 92 and 94 until such time as temperature difference position, b, is reached, representing a full circulating or diversion of heat exchange fluid from conduit 58 into conduit 92. As the zone return air temperature further increases to the level represented as a temperature difference, d, the first compressor stage 30 is activated to commence conventional refrigeration operation at evaporator coil 18. Should this cooling combination from liquid cooling coil 16 and evaporator coil 18, operating in conjunction with compressor stage 30, still not be sufficient, the zone temperature will increase further to establish a temperature difference represented at position, f, whereupon the second compressor stage 32 is activated such that the system is performing at maximum cooling capacity. As this high cooling activity commences, the zone return air temperature will commence to lower and control system 90 will function to turn off the second compressor stage 32 first, as represented at position, e. With the additional cooling down of the zone toward the set point temperature, system 90 then deactivates the first compressor stage 30 as the temperature differential reaches the position, c. At the zone then more closely approaches the set point temperature value, control function 90 will commence to progressively activate motor 96 to, correspondingly, progressively lessen the amount of heat exchange fluid permitted to flow into conduit 92 and thence to liquid cooling coil 16. This activity ensues until valve 60 terminates the flow of heat exchange fluid to liquid cooling coil 16. Of particular importance in connection with the foregoing operational description, it should be noted that the first operational components to be deactivated as the zone whose air is being treated approaches the predetermined set point are the least energy conserving components, i.e. the refrigeration components incorporating compressor stages 30 and 32. Full advantage is taken of the heat exchange taking place at outdoor heat exchanger 50 to contribute to cooling.

Figure 3:
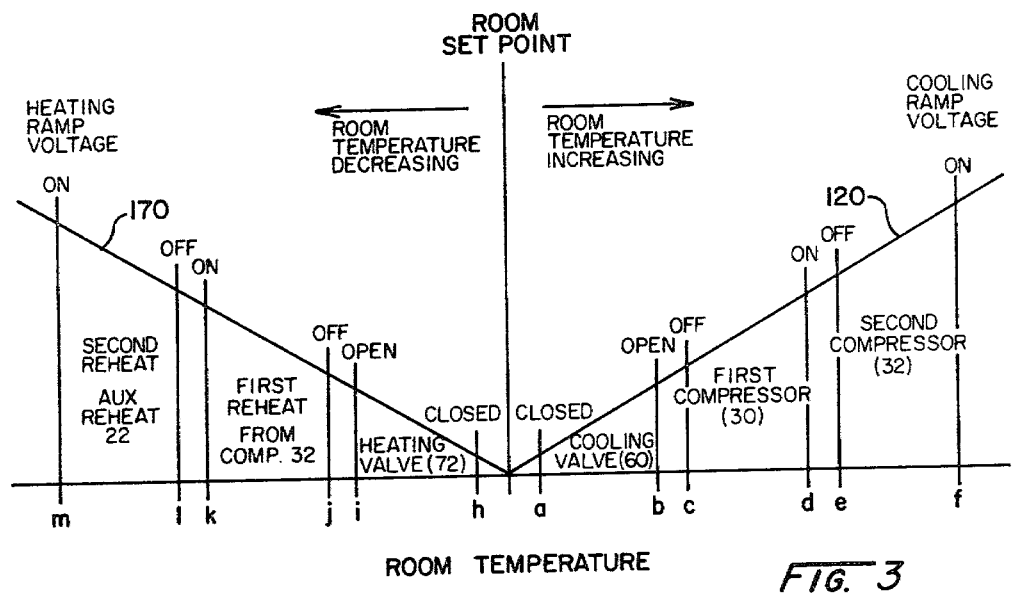
FIG. 3 is a generalized graphical illustration of the ramp control votage versus temperature.

FIG. 3 further reveals that the control system of the invention functions to turn on compressor stages 30 and 32 in conjunction with a temperature difference between the set point temperature and the sensed return air temperature which is of greater magnitude than the corresponding temperature differences at which positions these compressors are turned off. This arrangement permits a more efficient operation of the compressor stages. For example, by operating the stages over these temperature differentials or bands, adequate time will be provided for the zone temperature response to be observed at sensor 28 before actuating on and off logic at the compressors, i.e. the slow response rate of the entire system is accommodated for by this form of operation. It should be noted, however, that for computer room installations the return air cycle amounts to about 60 seconds. Returning to FIG. 1, depending upon the season, the cooling capacities of cooling coil 16, operating in conjunction with outdoor heat exchanger 50, can be quite significant. For example, at approximately a 60° F. heat exchange fluid temperature within conduit 58, liquid cooling coil 16 will assert a cooling capacity generally equivalent to one of the refrigeration compressor stages. Further, as the fluid temperature reaches about 45° F. (corresponding to about a 35° F. ambient or outdoor temperature) liquid cooling coil 16 is capable of assuming a cooling capacity equivalent to the operation of the refrigeration components utilizing both compressor stages 30 and 32. When either or both of the latter stages are in an off condition, a form of "runaround loop" is effected with respect to coil 16 and heat exchanger 50. In this regard, when both compressor stages are off, valves 64 and 74 will assume an orientation wherein the fluid exchange medium passes through conduits 92 and 94 into liquid cooling coil 16 and then is diverted through lines 61 and 62 to respective valves 74 and 64 to return to the input conduit 70 and, thence, to outdoor heat exchanger 50. In the event that the zone load is lessened such that too much cooling would otherwise occur, the control asserted by motor 96 over valve 60 is activated and the valve is gradually turned toward a closed position. However, inasmuch as valve 54, operating in conjunction with motor 110, is arranged to limit the minimum temperature which the heat exchange fluid can assume in the output conduit, under these conditions of maximum outdoor derived cooling, fluid asserted from conduit 75 will be circuited through valve 54 to achieve the earlier described minimum fluid temperature.

Monitoring of the humidity of the treated zone air is carried out by a humidity sensor and associated control system shown, respectively, at 130 and 132. Sensor 130 is positioned to sample return air at input duct 10 and, upon sensing a lack of adequate moisture within that air, provides a signal acted upon by control 132 which activates humidification stage 24 by an appropriate signal asserted along line 134.

In the event that the moisture content sensed at sensor 130 is above a desired level, then control 132 asserts a corresponding signal to control function 90, as represented schematically by line 136. Control function 90 responds by causing the system to cool return air both by utilizing the cooling available at liquid cooling coil 16, as well as at evaporator coil 18, the latter operating in conjunction with second compressor stage 32 functioning in conjunction with condenser 44. By thus cooling the air passing through the system, the level of air-entrained moisture is reduced. However, the return air temperature ultimately witnessed at senosr 28 generally will be below the desired set-point temperature for the controlled zone. Accordingly, reheat coils 20a and/or 20b as well as auxiliary reheat coil 22 may become active within the system to regain the temperature set-point. Concerning liquid cooling coil 16, the command asserted from control function 90 is one causing motor 96 to actuate valve 60 to permit the diversion of a predetermined amount of circulating heat exchange fluid through conduits 92 and 94. For example, a signal representing about a one-half open valve condition may be asserted, depending upon the initial temperature of the liquid as determined by sensor 102 and over-ride switch 104. The heat exchange fluid then circuits through condenser 44 in heat exchange relationship with refrigerant gases passing therethrough from compressor stage 32. As before, this heat exchange fluid, as controlled from valve 74, passes along input conduit 70 to heating valve 72. If this fluid is of sufficiently high temperature, by command from control function 90 as represented by line 145, heating valve 72 is driven by motor 138 as energized from line 147 to permit the diversion of hot heat exchange fluid along conduits 140 and 142 to reheat coil 20a. Note that coil 20a is positioned to confront air as it passes from evaporator coil 18. As a condition precedent to this diversion, however, an over-ride control is asserted, as represented at block 144, which responds both to the temperature of the heat exchange fluid at input conduit 70, as measured by a senosr 146, and to the temperature of air having passed through evaporator coil 18, as measured by a sensor 148. Input to control 144 from sensor 146 is represented by line 150, while the corresponding input from sensor 148 is represented by line 152. Thus, valve 72 is opened in correspondence with the temperature differential of the air returning from the conditioned zone and evaluated at sensor 28 with respect to the predetermined set-point temperature. However, in order for this diversion of heat exchange fluid to take place, the temperature of the fluid within input line 70 must be sufficiently high so as to be above the temperature of air having passed through evaporator coil 18.

Reheat coils 20a and 20b are provided as two separate and distinct heat exchanging devices. Coil 20a operates only in conjunction with conduits 140 and 142 for the circulation of heat exchange fluid. Coil 20b operates in conjunction with the heated refrigerant gases generated during dehumidification procedures by compression stage 32. In this regard, should the amount of reheating made available from conduits 140 and 142 be insufficient to return the zone return air to its set-point temperature, then a signal will be asserted from control function 90 along line 154 to diverting valve 158. Valve 158 which may be of a type identified as Model 3031RB marketed by Emerson Electric Co., Marilyn Heights, Mo. responds to open fully in snap-action manner permitting the diversion of heated refrigerant gas from conduit 42 into conduit 160 to the downstream heating or reheat coil 20b. Having passed through coil 20b, the hot refrigerant gas then returns along conduit 164 to be asserted through conduit 43 into condenser 44. Thus, advantage is taken of the heat available from compressor stage 32 to reheat dehumidified but overly cool air. This arrangement may be found to be of particular value in installations wherein multiple airconditioning units are operated in conjunction with a single closed heat exchange fluid loop. As is described in more detail later herein, the control asserted is a step type function, valve 158 being actuated only in the event that sufficient thermal energy is not available from the heat exchange fluid passing along conduits 140 and 142. The heat value of the fluid within the latter conduits is available, depending upon the season and zone heat loading, both as a coolant within liquid cooling coil 16 and as a reheat media at coil 20a in consequence of the heat energy made available thereto by virtue of the operation of compressor stage 32 functioning in conjunction with condenser 44. Where this availabe dual utilization is not thermally possible, control 144 blocks the reheat function at heating valve 72 through actuation of motor 138.

In the event that the reheat effect generated by diversion of hot refrigerant gas through heating coil 20b is not sufficient, then auxiliary heating of the zone being conditioned is carried out. For example, auxiliary reheat coil may be present as an electric resistance device which is turned on by a signal derived through line 166. A broad variety of heating arrangements may be provided for this auxiliary heating function. For example, steam may be selectively passed through a properly positioned coil or other source of heat adjacent the region being environmentally controlled.

Thus far, the reheat function has been described in connection with the dehumidification of air within the zone being controlled. Conditions may arise within the controlled zone wherein a minor amount of heat is required to maintain the set-point temperature, no cooling function being carried out. The system of the invention also is operative to provide heating under these conditions, for example, control function 90 will signal motor 138, controlling heating valve 72, to circulate heat exchange fluid to reheat coil 20a in the manner above described to achieve appropriate set-point temperatures. For this to be carried out, however, the requisite condition that the fluid within conduit 70 be warmer than the air passing inactive evaporator coil 18 as determined at control 144 must be met. Thus, the energy conserving operation of the system continues under such conditions. Where the amount of heat still is insufficient, the control at 90 will respond by activating the auxiliary reheat facilities, for example, that shown at reheat coil 22.

Looking again to FIG. 3, the heating logic of the control system is represented schematically, a ramp shaped line 170 shown therein very generally representing a voltage signal level generated for varying differences between lower zone temperatures and the set-point temperature for the zone. The operation of the system in a heating mode is similar to that described in conjunction with the cooling mode, heating valve 72 being proportionally opened from its closed position, H, spaced from the set-point temperature a small fraction of a degree to define a dead band permitting a slight over-cooling, and extending to a temperature differential indicated at i, representing a full open position for the valve. Should the zone temperature continue to decrease, as witnessed at sensor 28, a zone temperature differential k, may be developed whereupon, should the system be operating in a dehumidification mode, the control system will actuate valve 158 to permit the passage of hot refrigerant gases from compressor stage 32 into the reheat coil 20b. Should this heat input remain insufficient to bring the temperature of the air within the treated zone toward the set-point temperature, the zone temperature may fall, for example, to a level representing the temperature difference, m. At the latter level, the control system activates the auxiliary reheat facility as represented at coil 22. As noted earlier herein, where dehumidification is not at hand, the temperature differential will be required to reach the level, m, before heating above that generated from conduits 140 and 142 is made available, the compression stage 32 not being active under such conditions. Additionally, the system operates the first and second reheat features in a manner wherein the auxiliary reheat coil 22 remains on even though the temperature difference of the zone being controlled is within the range of level m to level l. Similarly, the hot gas utilization from stage 32 continues as the temperature difference alters from levels k to j. The temperature differential spacing between various heating activities permits the system adequate time to witness the reaction of zone return temperatures to the operation of those heating functions. As in the case of the cooling operation of the system, those components demanding highest energy are the first to be cycled off as the zone return temperature approaches the predetermined zone set-point. This arrangement maximizes the efficiency of the air treatment system in a heating mode in complement with a similar arrangement provided when the system operates in a cooling mode.

Figure 2:
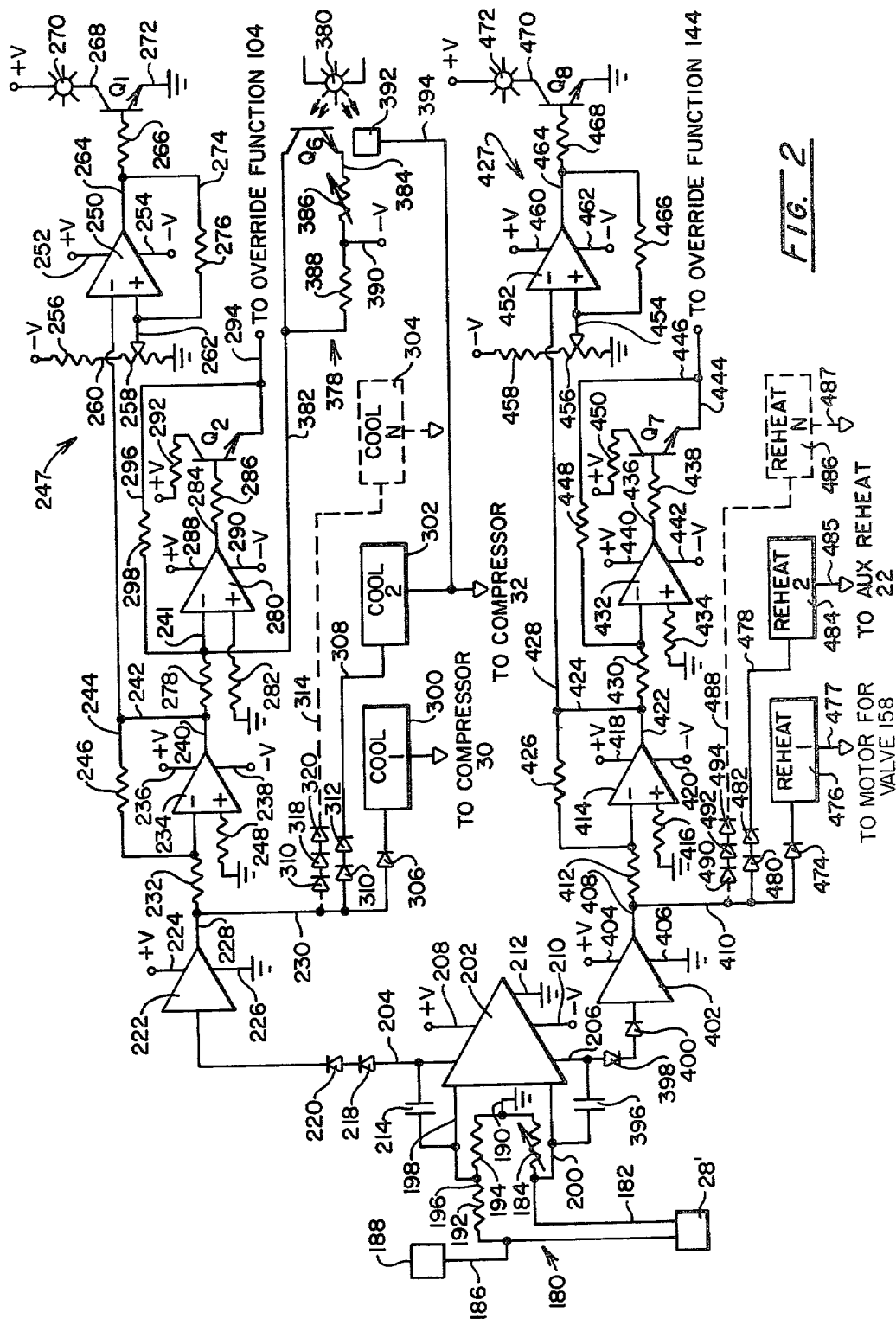
FIG. 2 is a schematic illustration of the ramp generator circuit utilized in a preferred embodiment.

Referring to FIG. 2, the control system represented at block 90 and at sensor 28 in FIG. 1 is revealed in detail. Sensor 28 is represented in the figure as function block 28′ situated within a d.c. bridge circuit, in turn, generally represented at 180. Described in detail in earlier mentioned U.S. Pat. No. 3,844,475, bridge circuit 180 includes sensor 28 now shown as 28′ operating within a line 182 also including a variable resistor 184 which is adjustable to insert a predetermined or set point temperature value. Bridge circuit 180 is connected through line 186 to a variable reference d.c. voltage supply represented by block 188, the adjustment of which permits a corresponding adjustment of the sensitivity range of the control system. The opposite side of bridge 180 is connected to ground through line 190 and resistors 192 and 194 are provided within line 196 to provide a center reference at line 198 which, operating in conjunction with the signal provided at center line 200, provides an output voltage corresponding with the differential in temperature between the set-point temperature established at resistor 184 and the witnessed temperature at thermistor or sensor 28′. The polarity of this signal determines whether the system is to call for greater cooling or whether the heating function of the system is to be activated. For example, a positive voltage signal will represent a call for cooling, while a corresponding negative voltage signal will call for heating.

Bridge output lines 198 and 200 are coupled to the corresponding inputs of a differential amplifier 202 which provides both a high resistance input to the bridge circuit 180 and serves to treat or buffer the resultant difference signals to present them alternately, for cooling control at output line 204 or for heating control at output line 206. Bridge circuit 180 and amplifier 202 serve generally as a comparison network. Amplifier 202 is coupled to a +v supply through line 208, to −v supply through line 210 and to ground through line 212. A capacitor 214 is connected between line 204 and input line 198 while, correspondingly, a capacitor 396 is connected between line 206 and input line 200, these components serving the conventional function of reducing the sensitivity of the system to spurious noise signals.

Assuming that a signal is represented at line 204 calling for operation of the system in a cooling mode, the resultant signal at line 204 is presented for d.c. level adjustment at diodes 218 and 220, whereupon the signal is introduced to the input of a buffer amplification stage 222. Providing improved current drive, stage 222 is shown connected to +v supply through line 224 and to ground through line 226 and has an output at line 228. The voltage level signal at output line 228 is directed therefrom along two functional paths, one being through line 230 to the staged level responsive switching control over refrigeration components of the system and the other to a valve control network through an input resistor 232 to one input of a differential amplifier 234, the latter serving as the input stage of a network deriving a linear signal for producing proportional drive to valve motor 96. Amplifier 234 is coupled to +v and −v supplies respectively through lines 236 and 238 and provides an output at line 240. Line 240, in turn, is coupled with lines 242 and 244 in a feedback path arrangement incorporating feedback resistor 246. The opposite input to the amplifier is coupled to ground through a resistor 248. Resistor 248 is a compensating resistor accommodating any unbalance caused by bias currents within the amplification stage itself. With the feedback arrangement shown, amplifier 234 asserts a gain established by resistors 232 and 246 over the input signal thereto, for example, a gain of two, and serves to commence amplification following an initial voltage level corresponding with the fraction of a degree Fahrenheit described earlier as a "dead band" extent between the set-point and position a.

The output of amplification stage 234 at line 240 is directed into two functions, the initial one being a detector network 247 serving to provide a visible indicia that a cooling condition is underway at liquid cooling coil 16. In this regard, the output is asserted along lines 242 and 244 to one input of a differential amplifier 250. Coupled to +v and −v supply respectively through lines 252 and 254, the opposite input to the amplifier is provided from a reference network including resistors 256 and 258 connected within line 260 between −v supply and ground, the resistor 258 representing a winding associated with a wiper arm 262. Accordingly, when the voltage at input line 244 slightly exceeds that at wiper 262, amplifier 250 changes state at its output 264 which is asserted through current limiting resistor 266 to the base of an NPN transistor $Q_1$. The collector of transistor $Q_1$ is connected through line 268 and an indicator lamp 270 to +v supply, while the emitter thereof is coupled through line 272 to ground. With the arrangement thus shown, lamp 270 will be energized at such time as a voltage level beyond the earlier-described dead band is detected by amplification stage 250. The feedback arrangement about amplifier 250, including line 274 and resistor 276, is provided to assert a positive feedback to line 262 to enhance switching response in the manner of a Schmitt trigger.

Returning to the output at line 240 of amplifier 234, the amplified signal thereat is converted to a current through resistor 278 which is asserted through line 241 at one input of a differential amplifier 280. The opposite input to amplifier 280 is coupled through resistor 282 to ground, while the output thereof at line 284 is coupled through base resistor 286 to the base of an NPN transistor $Q_2$. Amplifier 280 is coupled to +v and −v supplies through respective lines 288 and 290. The collector of transistor $Q_2$ is connected through resistor 292 to +v supply, while the emitter thereof is connected to output line 294 as well as through line 296 and summing resistor 298 to the input of amplifier 280 at line 241. Thus, the input at line 241 is summed with the feedback from the output of transistor $Q_2$. Accordingly, the feedback loop incorporating resistor 298 encloses resistor 286 as well as the base-emitter junction of transistor $Q_2$ to remove any effects contributing to the non-linearity of the output at line 294. In consequence, a linear or proportional relationship is generated at line 294 in response to the temperature differentials evaluated at sensor 28' to evoke a linear output even though non-linear circuit components are utilized. In effect a "ramp" type output proportioned with the noted differentials of temperature is achieved which, looking to FIG. 1, is asserted at override function 104 for ultimate control of valve 60 through motor 96.

Returning to FIG. 2, and looking to the staging of the refrigeration components of the system, the compressor stages as at 30 and 32 are energized or activated when the differential between the set-point temperature and measured zone return air temperature reach predetermined levels, for example, as described at positions, d and f in FIG. 3. The signal representing a temperature differential present at line 230 is simultaneously presented to the level responsive switching arrangement for refrigeration component cooling control including threshold switching stages represented by blocks 300, 302 and 304. The control input to stage 300 includes a predetermined impedance within line 230 present as a diode 306, while the corresponding control input to stage 302 is provided at line 308 which incorporates a different impedance present as diodes 310 and 312 which will be seen to establish a start-up criteria requiring a higher temperature differential as described at f in connection with FIG. 3. As is apparent, greater numbers of stages can be utilized with the system, stage 304 being shown in phantom as at Nth stage having a control input represented by dashed line 314 incorporating an impedance defined by three diodes, 316, 318 and 320. With the provision of these selective impedances in combination with threshold responsive stages 300, 302 and 304, the voltage level required to trigger stage 300 to, in turn, activate compressor stage 30 may be of one given value, while, by virtue of the presence of diodes 310 and 312, the corresponding voltage level at line 230 required to trigger stage 302 to, in turn, activate compressor stage 32 will be incrementally higher and so on through stage N in accordance with the design attributes of the system.

Figure 2A:
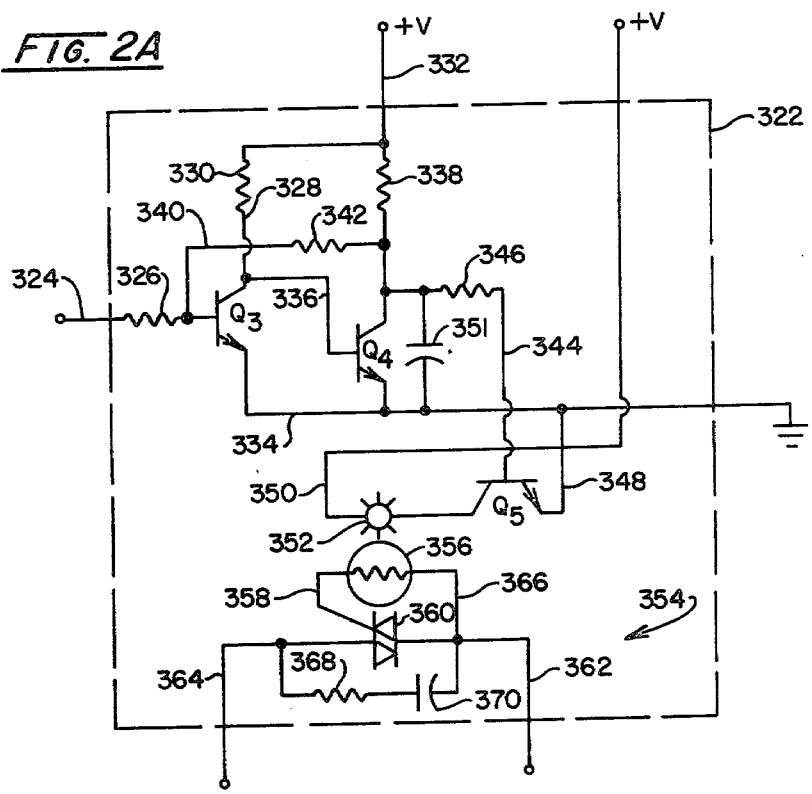
FIG. 2A is a circuit diagram showing an exemplary threshold responsive stage of the circuit of FIG. 2.

Turning to FIG. 2A, a circuit exemplary of those available for use as stages 300, 302 or 304 is revealed generally within dashed boundary 322. In general, the circuit 322 performs two functions, serving as a discrete component circuit to perform level switching which, in turn, drives a lamp which serves as an optical coupler to an output triac serving to energize the compressor stages. The input to the circuit at 322 is present at line 324, that line receiving the temperature differential responsive voltage levels as described in conjunction with line 230 in FIG. 2. Line 324 extends through a current limiting resistor 326 to the base of a normally "off" NPN transistor $Q_3$. The collector of transistor $Q_3$ is coupled through line 328 and current limiting resistor 330 to +v supply at line 332, while the emitter thereof is coupled through line 334 to ground. The collector of transistor $Q_3$ additionally is coupled through line 336 to the base of second, normally "on" NPN transistor $Q_4$. The collector of transistor $Q_4$ is coupled through line 332 and a current limiting resistor 338 to +v supply, as well as through line 340 and resistor 342 to the base of transistor $Q_3$, while its emitter is connected with line 334. A third NPN transistor $Q_5$ is present in the level responsive switching circuit, the base of which extends through line 344 and resistor 346 to line 332 at the collector of transistor $Q_4$. Having its emitter connected to ground through lines 348 and 334, the collector of transistor $Q_5$ is coupled through line 350 and a lamp 352 to an adjusted voltage supply. A capacitor 351 is connected across the collector and emitter terminals of transistor $Q_4$ for typical filtering purposes. With the arrangement shown, as a voltage signal of adequate level is presented at input line 324, transistor $Q_3$ is turned on to, in turn, remove the base drive to normally-on transistor $Q_4$ as asserted through resistor 330 and line 336 to cause it to turn off. As transistor $Q_4$ turns off, sufficient base drive is made available through resistors 338 and 346 to turn transistor $Q_5$ on. As transistor $Q_5$ conducts, lamp 352 is illuminated. This permits a switching action to take place at network 354. Network 354 comprises a photoconductor 356, the resistance of which varies in correspondence with the illumination thereon. Present, for example, as a photoconductor of the cadmium sulfide variety, photoconductor 356 is mounted to receive illumination from lamp 352 and is coupled through line 358 to the gate input of a triac 360. Triac 360, in turn, serves as a switching component within an a.c. power supply leading to a compressor or similar energy consuming device through lines as at 362 and 364. The opposite side of photoconductor 356 is coupled through line 366 to line 362, while a snubber network including resistor 368 and capacitor 370 is coupled across triac 360 to reduce the effects of high speed transients between input and output leads 362 and 364. As is apparent, with the illumination of lamp 352, the resistance of photoconductor 356 diminishes to, in turn, gate triac 360 into conduction in convenional cyclic fashion. As discussed in connection with FIG. 3, circuits as at 322 must serve to, for example, cause the first compressor stage 30 to turn on at level d, while turning off at a smaller temperature differential, as described, for example, at position c. This performance is carried out by the hysteresis characteristic of the networks as at 322. While typical threshold responsive switching circuits will exhibit a modicum of hysteresis performance, in the instant application this characteristic is emphasized. The hysteresis emphasis is provided by the positioning of earlier described line 340 incorporating resistor 342 between the base of transistor $Q_3$ and the collector of transistor $Q_4$.

As described in connection with FIG. 1, when humidity sensor 130, operating in connection with humidity control function 132, detects that a dehumidification procedure should be carried out, a signal was described as being interposed through line 136 to control function 90. This signal for dehumidification preferably is provided via an optical coupling to avoid spurious noise and the like. Returning to FIG. 2, such an indication of a need for dehumidification is shown being provided by the illumination of a lamp 380 as would be derived from control 132. Responding to this illumination is a signal network 378 including a photo-responsive transistor $Q_6$, the collector of which is connected to line 382, leading, in turn, to line 241 at the input to amplifier 280. The emitter of phototransistor $Q_6$ is connected by line 384 to a variable resistor 386, a resistor 388 and to line 382. A line 390 connects the junction of resistors 386 and 388 to $-v$ supply. With the arrangement shown, with the energization of lamp 380, transistor $Q_6$ assumes a saturated state to assert a predetermined amount of current established at resistor 386 to the line 241 input at amplifier 280. The latter input represents a summing point for the current feed from line 390 and transistor $Q_6$. Resistor 388 is of a fixed value which also applies a current from the $-v$ supply in constant fashion to the noted line 241 input to amplifier 280. This represents an off-setting arrangement to compensate for a fixed voltage which exists within the motor control circuitry. With the arrangement shown, a command is asserted at line 294 and through the override function 104 to cause motor 96 of valve 60 (FIG. 1) to open a predetermined amount and cause the cooling of air passing liquid cooling coil 16. A similar switching output is utilized to simultaneously turn on compressor stage 32 and thus activate the refrigeration components of the system, causing the cooling of air passing through evaporator coil 18. This switching arrangement is represented in FIG. 2 by block 392 which asserts an appropriate activating signal at the output of level sensitive switching stage 302 leading to compressor 32. The control condition of demand dehumidification will continue as long as lamp 380 is energized. Resistor 386 is adjusted in accordance with experience gained with the system, for example, it has been found that opening valve 60 to about half of its full extent represents a suitable adjustment.

As indicated in the description associated with FIG. 1, with a dehumidification operation of the cooling components of the system, it generally becomes necessary to reheat the cool but dehumidified air passing evaporator coil 18. This is carried out through the use of reheat coil 20 and, if necessary, additionally utilizing auxiliary reheat function 22. Looking to FIG. 2, the need for reheat operation will be sensed by sensor 28 now shown at 28'. The resultant call for heating is presented to amplifier 202 as a signal of sign opposite than that calling for cooling. Accordingly, amplifier 202 responds by asserting a corresponding voltage level signal at output line 206. This signal is treated in substantially the identical manner as described in connection with the cooling control system. Accordingly, a more cursory description of the heating control portion of the system is provided in the interest of lessening redundancy. As before, a filtering capacitor 396 is connected between lines 206 and 200 to provide for noise reduction. Additionally, the d.c. level of the signal is adjusted by diodes 398 and 400. Following such adjustment the signal is presented to the input of a buffer amplifier 402 to provide adequate current gain, the amplifier being shown connected between $+v$ supply and ground by respective lines 404 and 406. The output of amplifier 402 is present at line 408 and is directed to the level sensitive switching stages of the reheat portion of the system through line 410 and, simultaneously, through an input resistance 412 leading to one input of a differential amplifier 414. The opposite input to amplifier 414 is connected through compensating resistor 416 to ground, while the amplifier is coupled with positive and negative power supplies, respectively, from lines 418 and 420. The output of the amplifier at line 422 is connected with line 424 of a feedback path including feedback resistor 426 within line 428. As before, the selection of resistance values for resistors 412 and 426 is such as to provide a gain for the amplifier, for example, a gain two. The thus amplified signal is converted to a current through resistor 430 which is amplified to one input of differential amplifier 432. The opposite input to amplifier 432 is coupled through a resistor 434 to ground, while the output thereof at line 436 is connected through resistor 438 to the base of an NPN transistor $Q_7$. Positive and negative voltage is supplied to amplifier 432, respectively, from lines 440 and 442. Transistor $Q_7$ is connected within the circuit such that its emitter is coupled through lines 444, 446 and resistor 448 to the line 422 input to amplifier 432. As before, resistor 448 is a summing resistor performing with resistor 430 to establish a unity gain for the stage. The collector of transistor $Q_7$ is coupled through resistor 450 to $+v$ supply and the entire arrangement provides a linear output at line 444 having sufficient current gain to drive motor 138 of valve 72 in a manner linearly proportioned with the extent of temperature difference between the set-point for the zone being treated and that temperature witnessed at sensor 28'. This range of proportional adjustment has been described as extending from the outside of a dead band position, h, to position i, in FIG. 3. Similarly, as in the case of the cooling components, when motor 138 has been actuated, a corresponding signal is asserted to a detector network 427 along line 428 to one input of a differential amplifier 452. The input to the opposite side of amplifier 452 is established by the position of wiper arm 454 with respect to winding 456 of a set-point network including fixed resistor 458 and connected between $-v$ supply and ground. Amplifier 452 is coupled between $+v$ and $-v$ supply, respectively, by lines 460 and 462, has an output at line 464 and a feedback path including resistor 466 for the enhancement of switching acuity. Output line 464 extends through current limiting resistor 468 to the base of an NPN transistor $Q_8$, the emitter of which is coupled to ground and the collector of which is connected through line 470 and lamp 472 to +v voltage supply. As in the case of lamp 270, lamp 472 provides a visible indicia to the operator indicating that a signal has been generated calling for an opening of valve 72.

Looking to the reheat staging components of the control system, as indicated above, the signal at line 410 again represents a temperature differential between the set-point temperature and that temperature sensed at sensor 28'. This voltage level is adjusted by a first order or extent at diode 474 and presented to the input of a level sensitive switching function represented at block 476. Switching function 476 may be similar to that described in connection with FIG. 2A. The output of this stage, represented at line 477, serves to actuate a valve motor (not shown) to drive valve 158 to a desired position, for instance a full "on" condition thus permitting hot refrigerant gases to pass within reheat coil 20b. Switching function 476 further will exhibit a hysteresis characteristic such that it will turn on in correspondence with a temperature differential represented at level k in FIG. 3, while turning off the level j. The second staging withing the system is provided from line 478 which incorporates diodes 480 and 482 leading to the input of a similar level sensitive switching function represented by block 484. When the voltage level signal at line 410 is of sufficient magnitude, switching function 484 operates to carry out the energization of, for example, auxiliary reheat coil 20 as represented by output line 485. As shown in FIG. 3, the reheat coil 20 is turned on when the signal level reached a maxiumum value, m, and function 484 also is configured having a hysteresis characteristic such that coil 22 is not de-energized until such time as temperature differential level l is reached. As before, other reheating functions may be activated in the staggered fashion indicated, for example, a reheat function level sensitive switching arrangement being shown in phantom at 486 having an output at line 487 and an input at dashed line 488. The logic activation of function 486 may be controlled, as before, by diodes as at 490, 492 and 494. As is apparent, the reheat function of the apparatus provides both a linear proportional output at line 444 for operating a valve as at 72 and this operation is carried out in conjunction with the staged activation of higher energy demanding stages as switched through functions 476, 484 or 486. Of particular importance, with the arrangement shown, those staged components utilizing the most energy to achieve reheating are switched off with a priority related to the level of their energy consumption, the highest consumers of energy being turned on last and turned off first. Such an arrangement achieves maximized energy conservation for the entire system during its multi-seasonal utilization.

Since certain changes may be made in the above described system and apparatus without departing from the scope of the invention herein involved, it is intended that all matter contained in the description thereof or shown in the accompaying drawings shall be interpreted as illustrative and not in a limiting sense.

We claim:

1. In an air conditioning system of a variety treating air circulated within a zone to achieve a predetermined temperature within said zone and having a refrigeration system including operatively associated evaporator coil means, condenser means and one or more compressors, said condenser means being associated in heat exchange relationship, by fluid within input and output conduit means, with heat exchanger means situated within an ambient environment remote from said zone, said system further including cooling coil means positioned to effect the cooling of air directed to said evaporator coil means and connected with said conduit means through valve means for selectively receiving said fluid, said valve means being actuable to be selectively positioned in orientations between fully open and closed positions by voltage level responsive actuator means, and humidity sensor means for generating a signal representing a humidity level of said air with respect to a predetermined level, the improved control system comprising:

first temperature sensing means for deriving a first output signal representing the temperature of said air;

comparison network means responsive to said first output signal for deriving a second output singal having a value corresponding with the temperature difference between said predetermined temperature and a higher temperature of said air;

level responsive switching means coupled with said comparison network means for energizing a first said compressor when said second output signal is at a predetermined level corresponding with a said temperature difference of first predetermined magnitude to activate said refrigeration system;

valve control means coupled with said comparison network means and said voltage level responsive actuator means for effecting the actuation of said valve means by said actuator means in substantial proportion with said temperature differences when said differences are less than a second predetermined magnitude; and said second predetermined magnitude is less than said first predetermined magnitude.

2. The improved control system of claim 1 in which said level responsive switching means comprises a network exhibiting a hysteresis characteristic to an extent wherein said first compressor, upon being energized, remains energized when said second output signal is at levels corresponding with temperature differences between said first and said second predetermined magnitudes.

3. The improved control system of claim 1 in which said level responsive switching means is configured for energizing said first compressor when said second output signal is at levels corresponding with temperature differences between said first and said second predetermined magnitudes.

4. The improved control system of claim 1 including enabling switch network means, connected with said valve control network means and said voltage level responsive actuator means, for sensing the temperature of said fluid within said output conduit means passing therethrough from said heat exchanger means and responsive when said sensed temperature is at least a select level below said air temperature to enable said valve control network means to effect said actuation of said valve means.

5. The improved control system of claim 1 including:

first mixing valve means coupled between said input conduit means and said output conduit means at a location adjacent said heat exchanger means and remote from said zone; and first mixing valve actuator means coupled with said first mixing valve means for sensing the temperature of said fluid within said output conduit means, and selectively commingling fluid within said input conduit means with fluid within said output conunit means to provide a predetermined minimum temperature of fluid passing within said output conduit means selected to avoid the formation of condensation thereupon.

6. The improved control system of claim 1 in which said level responsive switching means comprises a network exhibiting a hysteresis characteristic to an extent wherein said first compressor, upon being energized, remains energized when said second output signal is at levels corresponding with temperature differences between said first and said second predetermined magnitudes; and including enabling switch network means connected intermediate said valve control network means and said voltage level responsive actuator means, for sensing the temperature of said fluid within said output conduit means passing therethrough from said heat exchanger means and responsive when said sensed temperature is at least a selected level below said predetermined temperature to enable said valve control network means to effect said actuation of said valve means.

7. The improved control system of claim 1 including detector network means coupled with said valve control network means for energizing a visible indicia in the presence of said second output signal.

8. The improved control system of claim 1 in which said valve control network means includes amplification stage means for converting said second output signals to third output signals wherein said third output signals are linearly proportioned with said temperature differences and are applied to effect said valve means actuation.

9. The improved control system of claim 1 in which:
said refrigeration system includes first and second said compressors; and
said level responsive switching means includes first and second threshold responsive switch means operative to energize respective said first and second compressors upon receipt of a voltage signal of predetermined magnitude, and impedance means coupled with said second threshold responsive switch means for diminishing the level of said second output signal by an amount effecting the energization of said second compressor when said second output signal is at a level corresponding with a said temperature difference of third predetermined magnitude, said third predetermined magnitude being greater than said first predetermined magnitude.

10. The improved control system of claim 1 including signal network means responsive to said humidity sensor means signal and coupled with said valve control network means for deriving a said second output signal of a level selected to effect a predetermined said actuation of said valve means by said actuator means.

11. The improved control system of claim 10 wherein said signal network means is responsive to said humidity sensor means signal to effect the energization of a said compressor.

12. The improved control system of claim 9 including signal network means responsive to said humidity sensor means signal and coupled with said valve control network means for deriving a said second output signal thereat of a level selected to effect a predetermined said actuation of said valve means by said actuator means; and for simultaneously effecting the energization of said second compressor.

13. In a system of a variety treating air circulated within a zone to achieve a predetermined temperature therewithin and having a refrigeration system including operatively associated evaporator coil means, condenser means and compressor means coupled to convey refrigerant gas to said condenser means, said condenser means being associated in heat exchange relationship, by fluid within input and output conduit means, with heat exchanger means situated within an ambient environment remote from said zone, said system further including cooling coil means positioned to effect the cooling of air directed to said evaporator coil means and connected with said output conduit means through cooling valve means for selectively receiving said fluid having been cooled by said heat exchanger means, said cooling valve means being actuable to be selectively positioned in orientations between fully open and closed positions by voltage level responsive first actuator means, humidity sensor means for generating a signal representing a humidity level of said air above a predetermined level, one or more heating coils positioned to effect the heating of air passing from said evaporator coil means, a first said heating coil being connected with said input conduit means through heating valve means for selectively receiving said fluid, said heating valve means being actuable to be selectively positioned in orientations between fully open and closed positions by voltage level responsive second actuator means, the improved control system comprising:
first temperature sensing means for deriving a first output signal representing the temperature of said air returning from the said circulation thereof;
comparison network means responsive to said first output signal for deriving a second output signal having a value corresponding with the temperature difference between said predetermined temperature and a higher temperature of said returning air and a third output signal corresponding with the temperature differential between said predetermined temperature and a lower temperature of said returning air; and
heating valve control network means coupled with said comparison network means for response to said third output signals and coupled with said voltage level responsive second actuator means for effecting the actuation of said said heating valve means in proportion with said temperature differences represented by said third output signal when said differences are less than a first predetermined magnitude, said second actuator means retaining said heating valve means in said fully open position when said temperature difference is equal to or greater than said first predetermined magnitude.

14. The improved control system of claim 13 including first enabling switch network means connected intermediate said heating valve control network means and said voltage level responsive second actuator means for sensing the temperature of said fluid within said input conduit means and the temperature of air exiting from said evaporator coil means and responsive when said fluid temperature within said input conduit means is a predetermined value higher than the temperature of said exiting air to enable said heating valve control network means to effect said actuation of said heating valve means.

15. The improved control system of claim 13 in which said heating valve control network means includes amplification stage means for converting said third output signals to fourth output signals wherein the voltage values of said fourth output signals are linearly proportioned with said temperature differences and are applied to effect said heating valve means actuation.

16. The improved control system of claim 13 wherein:
said system includes a second said heating coil situated to confront air treated by said first heating coil, connected to receive refrigerant gas from said compressor means through refrigerant valve means, and actuable between a first position effecting the passage of said gas to said condenser means and a second position effecting the passage of said gas to said second heating coil by refrigerant valve actuator means; and
said control system further comprises first level responsive switching means coupled with said comparison network means and said refrigerant valve actuator means for effecting the actuation of said refrigerant valve means to said second position when said third output signal is at a predetermined level corresponding with a said temperature difference of second predetermined magnitude which is greater than said first predetermined magnitude.

17. The improved control system of claim 16 wherein:
said system includes third air heating means actuable for heating air having been treated by said first and second heating coils; and
said first level responsive switching means is configured to actuate said third air heating means when said third output signal is at a predetermined level corresponding with temperature difference of third predetermined magnitude which is greater than said second predetermined magnitude.

18. The improved control system of claim 16 in which said first level responsive switching means comprises a network exhibiting a hysteresis characteristic to an extent wherein said refrigerant valve means, upon being actuated to derive said second position, remains in said second position when said third output signal is at levels corresponding with temperature differences of values between said first and said second predetermined magnitudes.

19. The improved control system of claim 17 in which said first level responsive switching means comprises a network exhibiting a hysteresis characteristic to an extent wherein said third air heating means, upon being actuated, remains actuated when said third output signal is at levels corresponding with temperature differences of values between said second and third predetermined magnitudes.

20. The improved control system of claim 14 or 16 further comprising:
cooling valve control network means coupled with said comparison network means for response to said second output signals and coupled with said voltage level responsive first actuator means for effecting the actuation of said cooling valve means by said first actuator means in proportion with said temperature differences represented by said second output signals when said differences are less than a fourth predetermined magnitude, said first actuator means retaining said cooling valve means in said fully open position when said temperature difference is equal to or greater than said fourth predetermined magnitude.

21. The improved control system of claim 20 further comprising:
second level responsive switching means coupled with said comparison network means for response to said second output signals for energizing a first said compressor when said second output signal is at a predetermined level corresponding with a said temperature difference of fifth predetermined magnitude, which is greater than said fourth predetermined magnitude, to activate said refrigeration system.

22. The improved control system of claim 21 further comprising:
second enabling switch network means connected intermediate said cooling valve control network means and said voltage level responsive first actuator means for sensing the temperature within said output conduit means passing therethrough from said heat exchanger means and responsive when said sensed temperature is at least a selected level below said return air temperature to enable said cooling valve control network means to effect said actuation of said cooling valve means.

23. The improved control system of claim 21 in which said cooling valve control network means includes amplification stage means for converting said second output signals to fifth output signals wherein the voltage values of said fifth output signals are linearly proportioned with said temperature differences and are applied to effect said cooling valve means actuation.

24. The improved control system of claim 21 in which said second level responsive switching means comprises a network exhibiting a hysteresis characteristic to an extent wherein said first compressor, upon being energized, remains energized when said second output signal is at levels corresponding with temperature differences between said fourth and fifth predetermined magnitudes.

25. In an air conditioning system of a variety treating air circulated within a zone to achieve a predetermined temperature within said zone and having a refrigeration system including operatively associated evaporator coil means, condenser means and first and second energizable compressors, said condenser means being associated in heat exchange relationship, by fluid within input and output conduit means, with heat exchanger means situated within an ambient environment remote from said zone, said system further including cooling coil means positioned to effect the cooling of air directed to said evaporator coil means and connected with said conduit means through valve means for receiving said fluid in heat exchange relationship, said valve means being actuable to selectively effect the passage of said fluid into said cooling coil means, the improved control system comprising:
temperature sensing means situated within said zone for deriving an output signal representing the temperature of said air;
valve control means including means responsive to the temperature of fluid within said output conduit and means responsive to said temperature sensing means output signal for actuating said valve means to effect said passage of fluid into said cooling coil means when said fluid temperature within said fluid conduit is at or below a selected first level below said predetermined temperature and said output signal corresponds with a temperature of said air above said predetermined temperature;

first level responsive compressor control means responsive to said air temperature sensing means output signal for effecting the energization of said first compressor when said output signal corresponds with a temperature of said air at or above a second level selected above said first level; and second level responsive compressor control means responsive to a said air temperature sensing means output signal for effecting the energization of said second compressor when said output signal corresponds with a temperature of said air at or above a third level selected above said second level.

26. The improved control system of claim 25 in which said means responsive to the temperature of fluid within said output conduit is situated substantially adjacent said valve means.

27. The improved control system of claim 25 in which said first level responsive compressor control means is configured to exhibit a hysteresis operational characteristic to an extent wherein said first compressor, upon being energized at or above said second level, remains so energized at temperatures of said air below said second level but above said first level.

28. The improved control system of claim 25 or 27 in which said second level responsive compressor control means is configured to exhibit a hysteresis operational characteristic to an extent wherein said second compressor, upon being energized at or above said third level, remains so energized at temperatures of said air below said third level but above said second level.

29. The improved control system of claim 25 in which said first level responsive compressor control means includes first threshold responsive switch means operative to energize said first compressor upon receipt of a voltage signal of predetermined magnitude.

30. The improved control system of claim 29 in which said second level responsive compressor control means includes second threshold responsive switch means operative to energize said second compressor upon receipt of a voltage signal of predetermined magnitude and further including impedance means coupled for selectively diminishing the magnitude of voltage signals asserted thereto.

31. In an air conditioning system of a variety treating air circulated within a zone to achieve a predetermined temperature within said zone and having a refrigeration system including operatively associated evaporator coil means, condenser means and one or more compressors, said condenser means being associated in heat exchange relationship by fluid within input and output conduit means, with heat exchanger means situated within an ambient environment remote from said zone, said system further including cooling coil means positioned to effect the cooling of air directed to said evaporator coil means and connected with said conduit means through valve means for selectively receiving said fluid, said valve means being actuable to open and closed positions, the improved control system comprising:

first temperature sensing means for deriving a first output signal representing the temperature of said air;

comparison means responsive to said first output signal for deriving a second output signal having a value corresponding with the temperature difference between said predetermined temperature and a higher temperature of said air;

level responsive switching means coupled with said comparison means for energizing a first said compressor when said second output signal is at a predetermined level corresponding with a said temperature difference of first predetermined magnitude to activate said refrigeration system;

valve control means coupled with said comparison network means and said voltage level responsive actuator means for effecting the actuation of said valve means in correspondence with said temperature differences when said differences are less than a second predetermined magnitude;

said second predetermined magnitude is less than said first predetermined magnitude;

first mixing valve means coupled between said input conduit means and said output conduit means at a location adjacent said heat exchanger means and remote from said zone; and first mixing valve actuator means coupled with said first mixing valve means for sensing the temperature of said fluid within said output conduit means, and selectively commingling fluid within said input conduit means with fluid within said output conduit means.

32. In an air conditioning system of a variety treating air circulated within a zone to achieve a predetermined temperature within said zone and having a refrigeration system including operatively associated evaporator coil means, condenser means and compressor means, said condenser means being associated in heat exchange relationship, by fluid within input and output conduit means, with heat exchanger means situated within an ambient environment remote from said zone, said system further including cooling coil means positioned to effect the cooling of air directed to said evaporator coil means positioned to effect the cooling of air directed to said evaporator coil means and connected with said conduit means through valve means for selectively receiving said fluid, said valve means being actuable to effect the select passage of said fluid from said output conduit to said cooling coil means, the improved control system comprising:

first temperature sensing means for deriving a first output signal representing the temperature of said air;

means responsive to said first output signal for deriving a second output corresponding with the difference between said predetermined temperature and air temperature when said air temperature is higher than said predetermined temperature;

valve control means responsive to said second output for effecting actuation of said valve means to open in correspondence with the extent of the said difference between said predetermined temperature and said air temperature;

means responsive to a predetermined cooling effect by said heat exchanger upon said fluid within said output conduit for enabling said valve control means to actuate said valve means; and level responsive switching means for selectively energizing said compressor means when the cooling capability of said cooling coil means is inadequate to cool said air to said predetermined temperature.

* * * * *